US008145226B2

(12) United States Patent
Kojima

(10) Patent No.: US 8,145,226 B2
(45) Date of Patent: Mar. 27, 2012

(54) WIRELESS COMMUNICATION METHOD, WIRELESS COMMUNICATION SYSTEM AND BASE STATION

(75) Inventor: Masaya Kojima, Yokohama (JP)

(73) Assignee: Kyocera Corporation, Kyoto (JP)

( * ) Notice: Subject to any disclaimer, the term of this patent is extended or adjusted under 35 U.S.C. 154(b) by 199 days.

(21) Appl. No.: 12/593,741

(22) PCT Filed: Mar. 26, 2008

(86) PCT No.: PCT/JP2008/055780
§ 371 (c)(1),
(2), (4) Date: Mar. 2, 2010

(87) PCT Pub. No.: WO2008/123324
PCT Pub. Date: Oct. 16, 2008

(65) Prior Publication Data
US 2010/0167752 A1    Jul. 1, 2010

(30) Foreign Application Priority Data
Mar. 29, 2007  (JP) ................................. 2007-088873

(51) Int. Cl.
*H04W 72/00* (2009.01)
(52) U.S. Cl. ...................................... 455/450; 455/452.2
(58) Field of Classification Search .................. 455/450, 455/452.2, 509, 550.1, 561
See application file for complete search history.

(56) References Cited

U.S. PATENT DOCUMENTS

| | | | | |
|---|---|---|---|---|
| 6,134,443 A | * | 10/2000 | Spann et al. | 455/450 |
| 6,968,156 B2 | | 11/2005 | Sugaya et al. | 455/67.11 |
| 2002/0049040 A1 | | 4/2002 | Sugaya et al. | 455/67.1 |
| 2006/0063533 A1 | * | 3/2006 | Matoba et al. | 455/452.2 |
| 2008/0130615 A1 | | 6/2008 | Kashiwagi et al. | 370/343 |
| 2009/0029710 A1 | | 1/2009 | Ochiai et al. | 455/450 |

FOREIGN PATENT DOCUMENTS

| | | |
|---|---|---|
| JP | 11-017644 | 1/1999 |
| JP | 2002-051050 | 2/2002 |
| JP | 2003-018117 | 1/2003 |
| JP | 2005-244598 | 9/2005 |
| JP | 2005-253021 | 9/2005 |
| WO | 2006/077696 A1 | 7/2006 |
| WO | WO 2006/088082 A1 | 8/2006 |

* cited by examiner

*Primary Examiner* — Nick Corsaro
*Assistant Examiner* — Joel Ajayi
(74) *Attorney, Agent, or Firm* — DLA Piper LLP (US)

(57) ABSTRACT

A base station (200) has an information acquiring unit (224) for acquiring information indicating an upper limit of a value based on the current consumption of a wireless communication terminal and the number of first frequency bands requested by the wireless communication terminal, a band number determining unit (221) for determining the number of second frequency bands to be assigned to the wireless communication terminal based on the acquired information indicating the upper limit of current consumption and a band number setting unit (222) for setting the number of first frequency bands to the number of frequency bands to be assigned to the wireless communication terminal when the number of first frequency bands is equal to or less than the number of second frequency bands and setting the number of second frequency bands to the number of frequency bands to be assigned to the wireless communication terminal when the number of first frequency bands is greater than the number of second frequency bands.

6 Claims, 13 Drawing Sheets

FIG. 9

| Name | Cellular phone | Modem type | PCMCIA type | SUB type | In-car type |
|---|---|---|---|---|---|
| Power supply standard | Battery | AC power supply | PCMCIA | USB | Battery |
| Max. current consumption | 700mA | 1000mA | 500mA | 300mA | 2000mA |
| Current consumption ID | 1 | 2 | 3 | 4 | 5 |
| The number of Tmp Bands | 8 | 12 | 5 | 3 | 24 |
| The number of guaranteed Bands | 6 | 8 | 4 | 2 | — |

FIG. 10
(a)
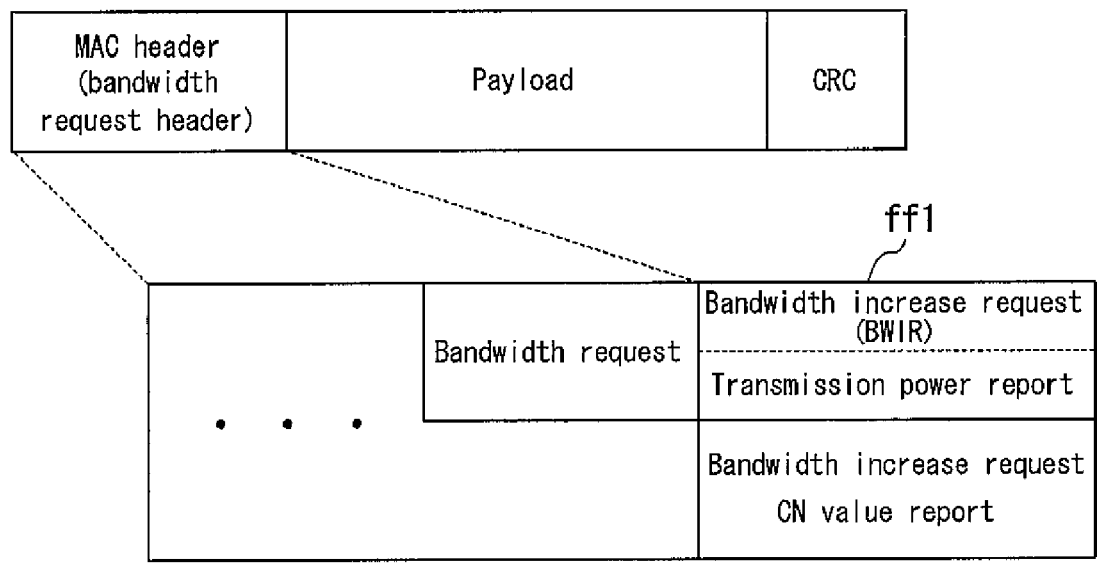
(b)
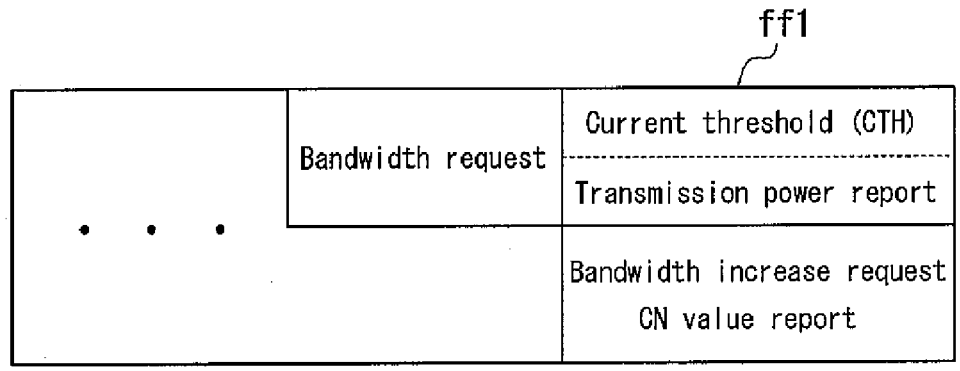

FIG. 11
(a)
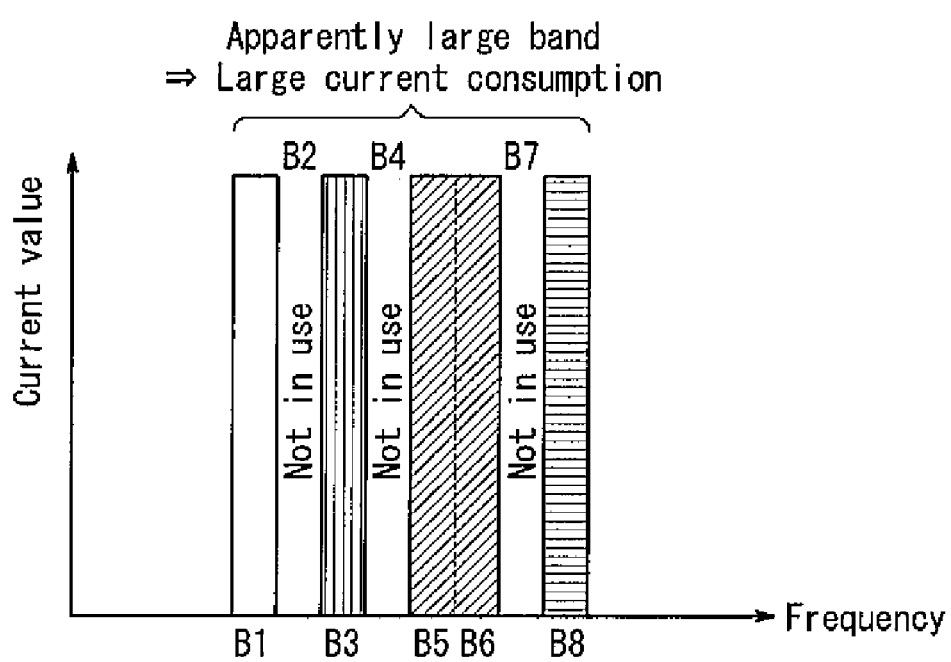
(b)
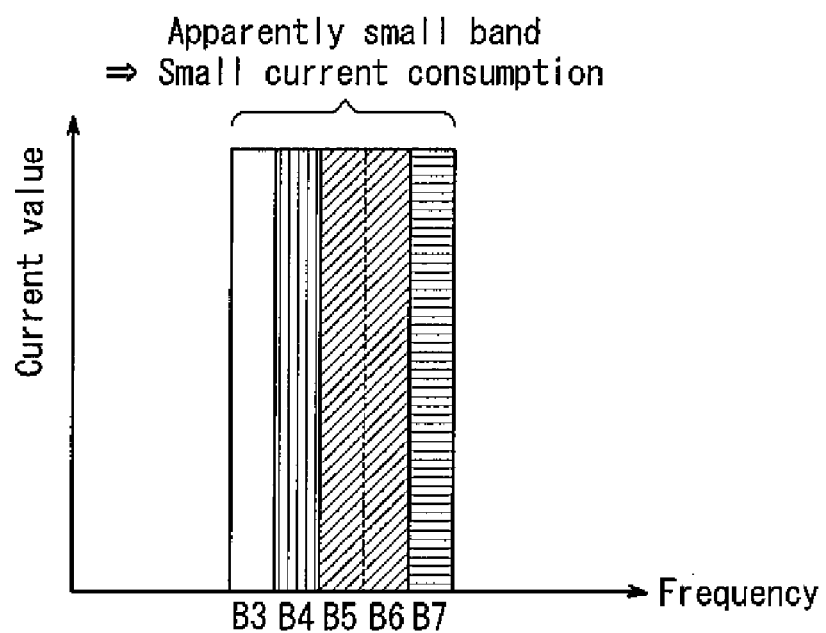

WIRELESS COMMUNICATION METHOD, WIRELESS COMMUNICATION SYSTEM AND BASE STATION

TECHNICAL FIELD

The present invention relates to a wireless communication method, a wireless communication system and a base station and, in particular, to a wireless communication method which improves throughput of a communication system as a whole by assigning the number of frequency bands to a terminal in consideration of the upper limit of power consumption of the terminal, a wireless communication system and a base station.

BACKGROUND ART

In wireless communication systems that have recently been progressed in development and research aiming at improvement in throughput, there is the Orthogonal Frequency Division Multiple Access (OFDMA) scheme. The Orthogonal Frequency Division Multiple Access (OFDMA) wireless communication system calculates the propagation path estimation information based on CN values (Carrier to Noise Ratio) from a terminal and reception power and specifies a frequency region in a good state of propagation path in the whole operating frequency band of received multicarrier signals. A wireless terminal specifies a frequency region in a good state of propagation path by selecting a subchannel in a good state of propagation path and notifies the base station of the subchannel information. Thus, only the region in a good state of propagation path in the operating frequency band is notified from the wireless terminal to the base station. Therefore the communication quality is improved, thus the throughput of the communication system can be improved and power consumption of the wireless terminal can be reduced (see Patent Document 1).

Moreover, there is a related art in which a receiving station of a wireless communication system reserves a plurality of frequency bands in preparation for a transmission error occurrence. For example, a technique (see Patent Document 2) for reserving a necessary wireless transmission band through, for example, a report of a transmission error occurrence status from the receiving station to the corresponding party, which is a wireless transmission apparatus, based on the measurement results of a transmission error occurrence status, has been proposed.

Patent Document 1: Japanese Patent Application Laid-Open No. 2005-244598
Patent Document 2: Japanese Patent Application Laid-Open No. 2002-051050

SUMMARY OF INVENTION

Technical Problems

According to the technique of Patent Document 1, a system is designed so that a base station calculates the propagation path estimation information based on a CN value (Carrier to Noise Ratio) transmitted from a terminal and reception power to specify a frequency region in a good state in the whole operating frequency band of received multicarrier signals, and the specified frequency band in a good state is notified to the terminal. Thus requests for bands from terminals concentrate on the frequency region in a good state. On the other hand, according to the technique of Patent Document 2, when a terminal reserves a plurality of bands and thus occupies the radio resource, other terminals cannot use the resource and thus it is impossible to improve the throughput of the whole communication system.

In addition, the base station estimates the propagation path state based on the CN value given from the terminal and specifies a favorable frequency region. However, when the terminal transmits the infeasible transmission power in the band, the terminal cannot realize the performance as expected. In other words, only a part of the frequency band secured for one terminal is used due to limit of transmission power. Therefore, although there is unused band, the occupied unused band cannot be used by other terminals, and thus the other terminals are subject to band limitation, resulting in decline in the performance of the whole system.

It is an object of the present invention to provide a technique (method, apparatus, system) that assigns the number of frequency bands to a terminal in consideration of the upper limits of current consumption and power consumption of the terminal to improve the throughput of the whole communication system.

Solutions to Problems

In order to solve the above mentioned problems, a wireless communication method in accordance with the present invention is a wireless communication method for performing wireless communications between a base station and a wireless communication terminal, and comprises:

a reception state measuring step at which the wireless communication terminal measures information (e.g. CINR/SINR) indicating a reception state of the wireless communication terminal;

a first frequency band number determining step at which the wireless communication terminal determines the number of first frequency bands (e.g. the number of subcarriers of OFDMA) to be requested to the base station based on the information indicating the reception state;

a transmitting step at which the wireless communication terminal transmits the information indicating the number of first frequency bands to be requested to the base station to the base station;

a receiving step at which the base station receives the information indicating the number of first frequency bands which is transmitted from the wireless communication terminal;

an acquiring step for acquiring information indicating an upper limit of a value based on current consumption of the wireless communication terminal;

a second frequency band number determining step for determining the number of second frequency bands to be assigned to the wireless communication terminal based on the acquired information indicating the upper limit of the value based on the current consumption; and a frequency band number setting step of setting the number of first frequency bands to the number of frequency bands to be assigned to the wireless communication terminal when the number of first frequency bands is equal to or less than the number of second frequency bands and setting the number of second frequency bands to the number of frequency bands to be assigned to the wireless communication terminal when the number of first frequency bands is greater than the number of second frequency bands.

Further, in the wireless communication method in accordance with an embodiment of the present invention, at the transmitting step, the information indicating the reception state of the wireless communication terminal is transmitted with the number of first frequency bands to the base station;

at the receiving step, the information indicating the reception state of the wireless communication terminal is received with the number of first frequency bands which is transmitted from the base station; and the wireless communication method further comprises a position setting step at which the base station sets a position of each frequency band to be assigned based on the information indicating the reception state of the wireless communication terminal and the number of frequency bands to be assigned.

In addition, the wireless communication method in accordance with an embodiment of the present invention further comprises:

a second frequency band number setting step at which, when the base station receives a plurality of pieces of information indicating the number of first frequency bands which are transmitted from a plurality of wireless communication terminals, the base station sets the number of frequency bands by placing priority on a wireless communication terminal whose upper limit of a value based on current consumption is larger among the plurality of wireless communication terminals in a case where a sum of the numbers of second frequency bands to be used by the plurality of wireless communication terminals is greater than a predetermined number of frequency bands.

Moreover, the wireless communication method in accordance with an embodiment of the present invention further comprises:

a moving speed information acquiring step at which the base station acquires information on moving speed of the wireless communication terminal; and a frequency assigning scheme determining step at which the base station determines a frequency assigning scheme (e.g. which to use, Band AMC of Orthogonal Frequency Division Multiple Access (OFDMA) or Band PUSC) to be used when assigning frequency to the wireless communication terminal based on the information on the moving speed of the wireless communication terminal.

While the means for solving the problems has been described as a wireless communication method as described above, it should be appreciated that the present invention can be realized as an apparatus (system, base station, wireless communication apparatus or the like), a method, a program and a recording medium that stores programs and these are included in the scope of the present invention.

For example, a wireless communication system in accordance with an embodiment of the present invention which realizes the present invention as a system is a wireless communication system for performing wireless communication between a base station and a wireless communication terminal, wherein the wireless communication terminal comprises:

a reception state measuring unit for measuring information (e.g. CINR/SINR) indicating a reception state of the wireless communication terminal;

a band number determining unit for determining the number of first frequency bands (e.g. the number of subcarriers of OFDMA) to be requested to the base station based on the measured information indicating the reception state; and a transmitting unit for transmitting the information indicating the number of first frequency band to be requested to the base station to the base station, and the base station comprises:

a receiving unit for receiving the information indicating the number of first frequency bands which is transmitted from the wireless communication terminal;

an information acquiring unit for acquiring information indicating an upper limit of a value based on current consumption of the wireless communication terminal;

a band number determining unit for determining the number of second frequency bands to be assigned to the wireless communication terminal based on the acquired information indicating the upper limit of the value based on the current consumption; and a band number setting unit for setting the number of first frequency bands to the number of frequency bands to be assigned to the wireless communication terminal when the number of first frequency bands is equal to or less than the number of second frequency bands and setting the number of second frequency bands to the number of frequency bands to be assigned to the wireless communication terminal when the number of first frequency bands is greater than the number of second frequency band.

Moreover, a base station in accordance with an embodiment of the present invention is a base station for performing wireless communications with a wireless communication terminal, and comprises:

a terminal information acquiring unit for acquiring information indicating an upper limit of a value based on current consumption of the wireless communication terminal and the number of first frequency bands requested by the wireless communication terminal;

a band number determining unit for determining the number of second frequency bands to be assigned to the wireless communication terminal based on the acquired information indicating the upper limit of the value based on the current consumption; and a band number setting unit for setting the number of first frequency bands to the number of frequency bands to be assigned to the wireless communication terminal when the number of first frequency bands is equal to or less than the number of second frequency bands and setting the number of second frequency bands to the number of frequency bands to be assigned to the wireless communication terminal when the number of first frequency bands is greater than the number of second frequency bands.

According to the present invention, the throughput of whole system can be improved by assigning bands (the number of frequency bands) in consideration of the number of bands requested by a terminal, current consumption of the terminal and the upper limit of current consumption.

BRIEF DESCRIPTION OF DRAWINGS

FIG. 9 is a table in which terminal types and maximum current consumptions are associated;

FIG. 10 shows the format of a message to be transmitted to a base station;

FIG. 11 shows a band assignment in accordance with the technique of the present invention;

DESCRIPTION OF THE PREFERRED EMBODIMENTS

Figure 1:
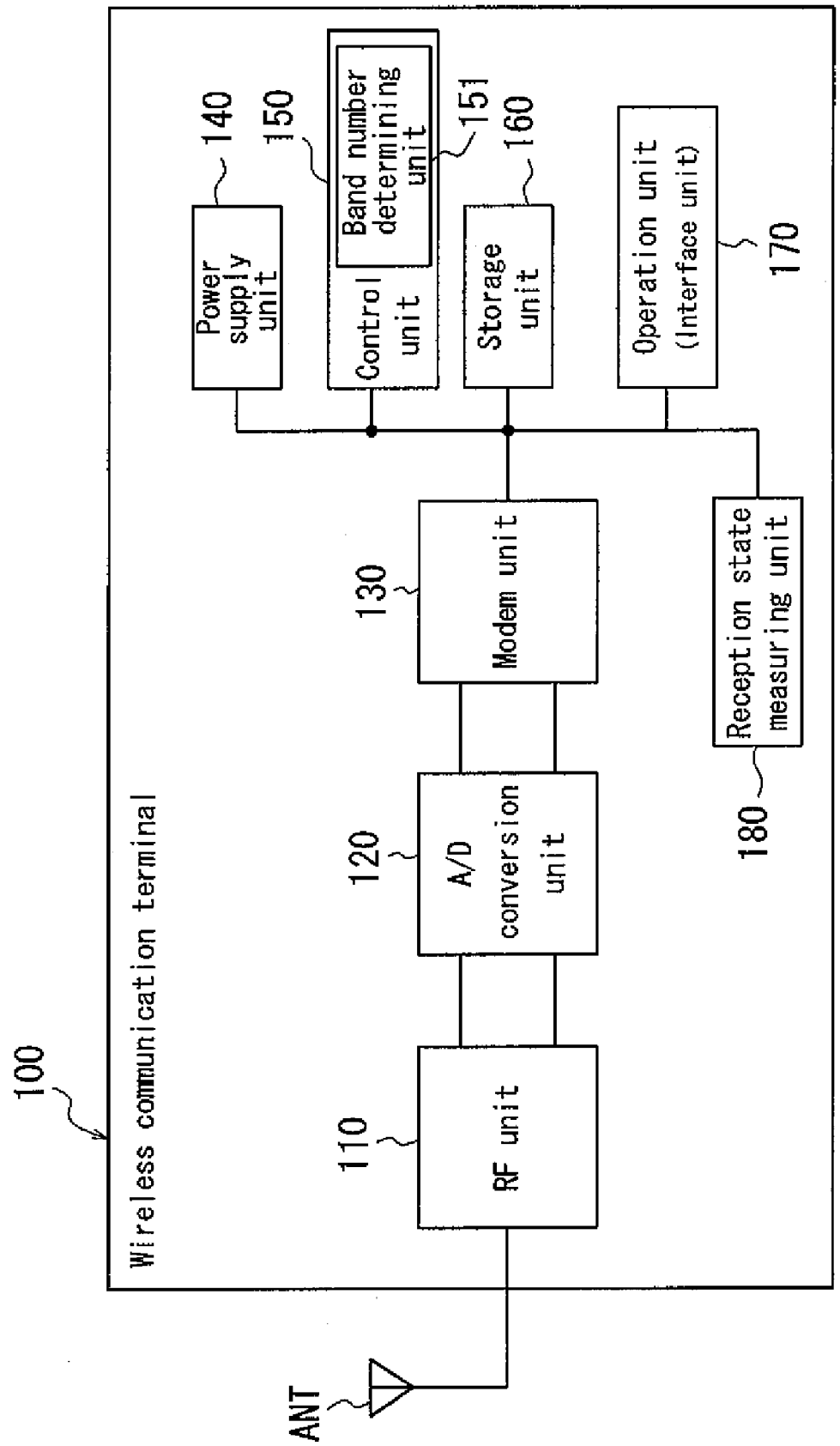
FIG. 1 is a block diagram of a wireless communication terminal that uses the OFDMA communication scheme in accordance with an embodiment of the present invention.

Embodiments of the present invention will be described hereinafter in detail with reference to the drawings. FIG. 1 shows a block diagram of a wireless communication terminal that uses the OFDMA communication scheme in accordance with an embodiment of the present invention. As shown in the figure, a wireless communication terminal 100 includes an antenna ANT, an RF unit 110, an A/D conversion unit 120, a modem unit 130, a power supply unit 140, a control unit 150, a storage unit 160, an operation unit (interface unit) 170 and a reception state measuring unit 180. The control unit 150 has a band number determining unit 151. When receiving a signal, the RF unit 110 processes a radio signal received from the antenna ANT, and when transmitting a signal, processes a signal which has been D/A converted by the A/D conversion unit 120 and transmits the signal through the ANT. In other words, the wireless communication terminal 100 transmits and receives radio waves to and from the base station and performs encoding and decoding with the RF unit 110, the A/D conversion unit 120 and the modem unit 130. In the OFDMA scheme, the modem unit 130 performs processing such as FFT (First Fourier Transform) and IFFT (Inverse FFT) for multicarrier communication. The control unit 150 controls so that the information is operated and displayed based on the received data or the like and the information is stored in the storage unit 160. Some terminals have a function for interfacing with other equipment such as a notebook PC and can transmit and receive information acquired. In addition, the control unit 150 has functions for controlling so as to store the maximum current consumption of its own terminal in the storage unit 160 and to calculate the remaining amount of a battery of its own terminal from the power supply unit 140. The reception state measuring unit 180 measures and calculates the CN value in the RF unit 110, the A/D conversion unit 120 and the modem unit 130 based on the received signal and stores the value in the storage unit 160. A band number determining unit 151 determines the number of frequency bands (the number of bands=the number of subcarriers) to be requested to the base station, which is the corresponding party, based on the measured and calculated CN value.

Figure 2:
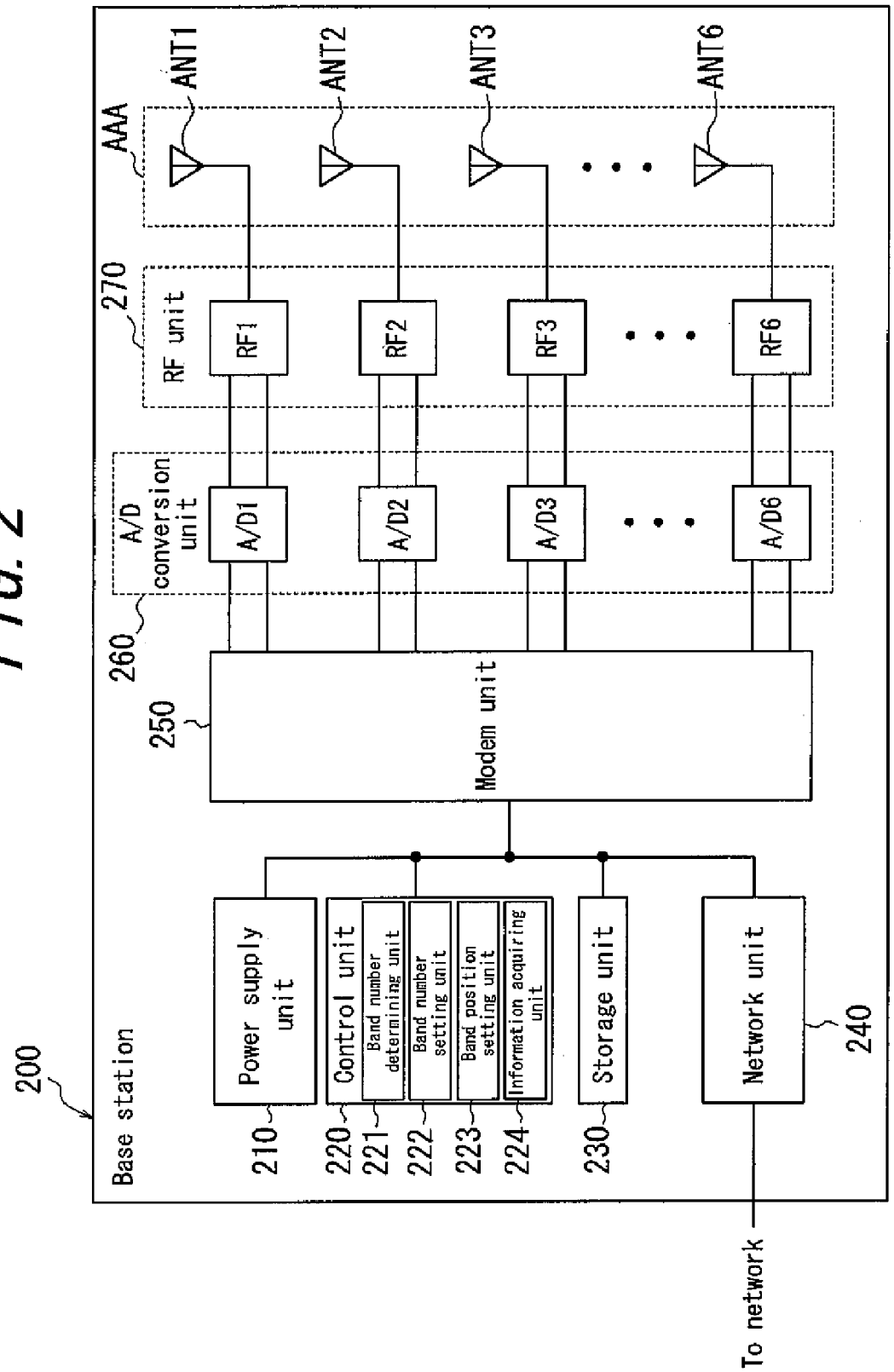
FIG. 2 is a block diagram of a base station (apparatus) that uses the OFDMA communication scheme in accordance with an embodiment of the present invention.

FIG. 2 is a block diagram of the base station (apparatus) that uses the OFDMA communication scheme in accordance with an embodiment of the present invention. As shown in the figure, the base station 200 has a power supply unit 210, a control unit 220, a storage unit 230, a network unit 240, a modem unit 250, an A/D conversion unit 260, an RF unit 270 and an adaptive array antenna AAA. The control unit 220 includes a band number determining unit 221, a band number setting unit 222, a band position setting unit 223 and an information acquiring unit (terminal information acquiring unit) 224. Further, the adaptive array antenna AAA is composed of six antennas ANT1 to ANT6. In order to perform signal processing to these six antennas, the RF unit 270 includes RF circuits RF1 to RF6 for the number of antennas, and the A/D conversion unit 260 includes A/D conversion units A/D1 to AD6. In this manner, the base station 200 is composed of a plurality of antennas to enable the beam forming using an adaptive array antenna technology and the MIMO (Multi Input Multi Output) technology. In addition, the received data is controlled by the control unit 220. The base station 200 keeps the network unit 240 to be connected to other base stations and servers not shown through a network.

The information acquiring unit 224 acquires information indicating an upper limit of a value based on current consumption of a wireless communication terminal, which is a corresponding party. The information indicating the upper limit of the value based on the current consumption may be the maximum current consumption (capacity) of the wireless communication terminal and includes the maximum power consumption (value) based on the power supply of the wireless communication terminal. In addition, the information acquiring unit 224 acquires the number of frequency bands requested by the wireless communication terminal. For example, the information acquiring unit 224 receives a current consumption ID as the information indicating the upper limit of the value based on the current consumption from the wireless communication terminal, and can acquire the upper limit of the value based on the current consumption of the wireless communication terminal with reference to a table (FIG. 9) in which the current consumption ID is associated with the maximum current consumption, stored in the storage unit 230. Further, in addition to the case where a current consumption ID is acquired from the wireless communication terminal, the information acquiring unit 224 can acquire information for specifying a type of wireless communication terminal from another base station or a high-level apparatus (base station control apparatus) at the time of handover, for example, and based on the information, acquire the maximum current consumption and the upper limit of power consumption with reference to the table of FIG. 9 showing association with each terminal type.

The band number determining unit 221 determines (calculates) the number of frequency bands to be assigned to the wireless communication terminal based on the information indicating the upper limit of the value based on the current consumption acquired by the information acquiring unit 224. When the number of frequency bands requested by the wireless communication terminal is equal to or less than the number of frequency bands determined by the band number determining unit 221, the band number setting unit 222 sets the number of the first frequency bands to the number of frequency bands to be assigned to the wireless communication terminal. The band position setting unit 223 sets each position of frequency bands to be assigned based on the information indicating the reception state of the wireless communication terminal acquired from the wireless communication terminal and "the number of frequency bands to be assigned" which is determined by the band number setting unit 222.

Figure 3:
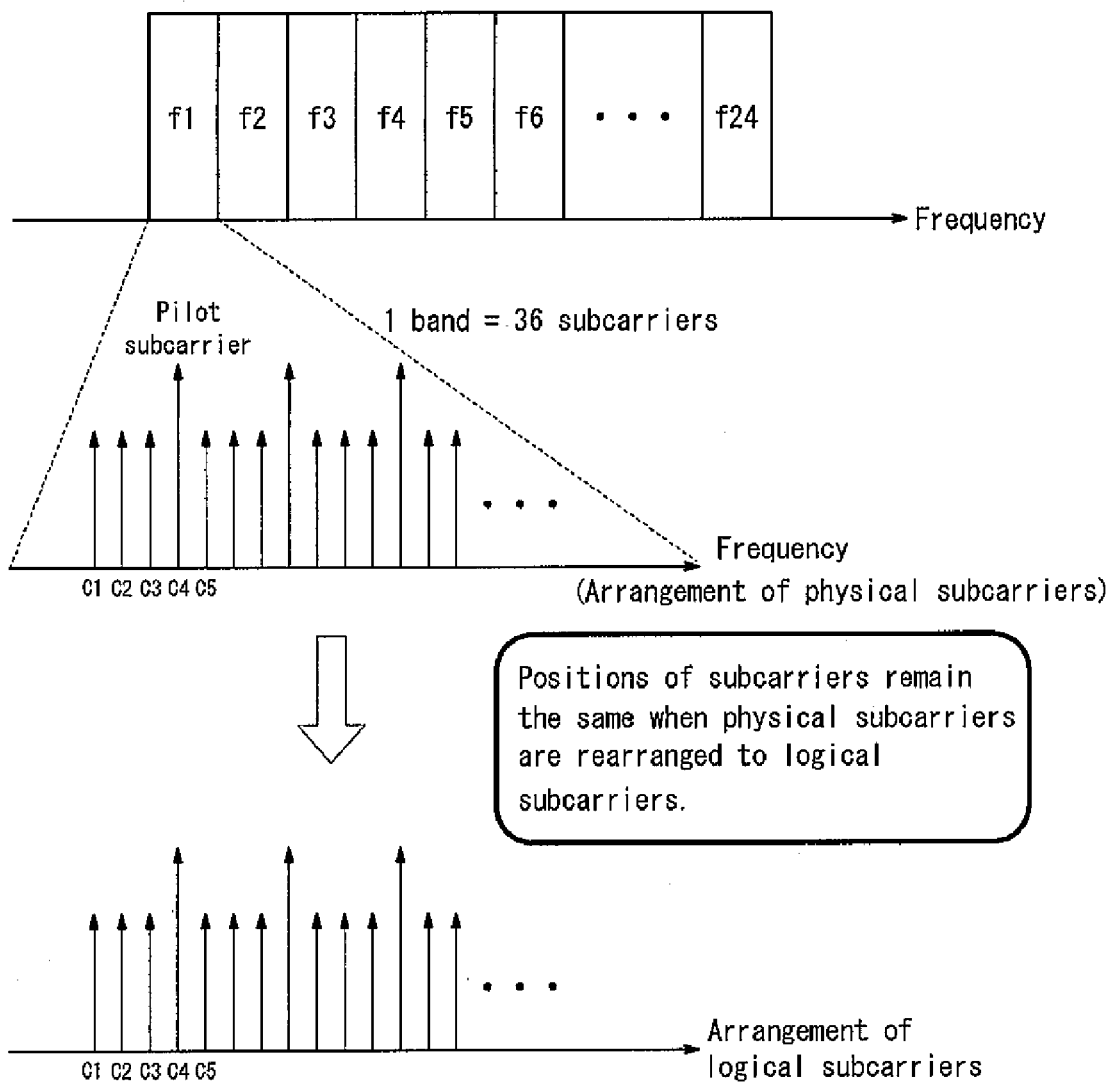
FIG. 3 is an explanatory diagram of the Band AMC scheme, which is a band assignment scheme of OFDMA used by the present invention.
Figure 4:
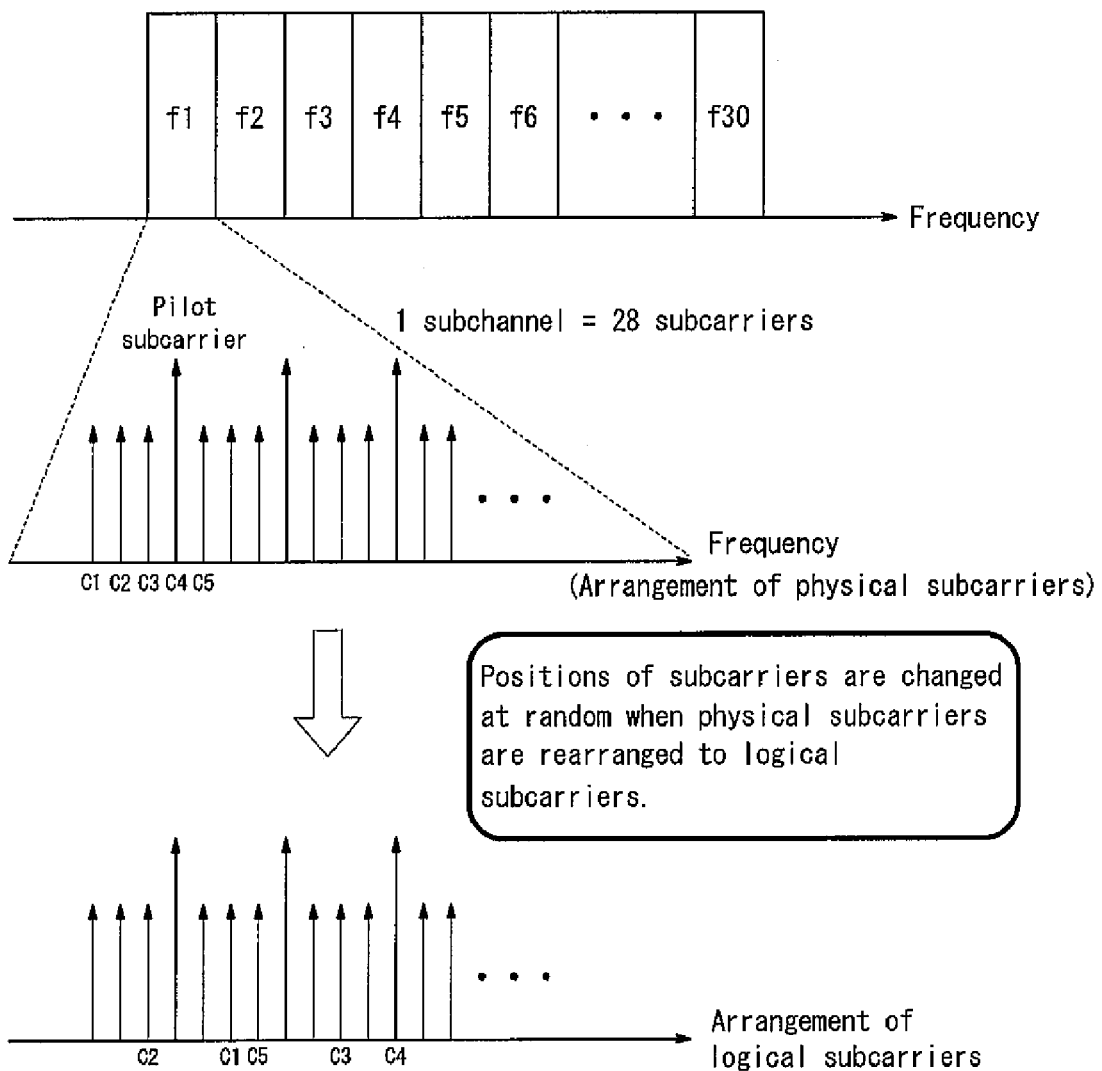
FIG. 4 is an explanatory diagram of the PUSC scheme, which is a band assignment scheme of OFDMA.

FIG. 3 is an explanatory diagram of the Band AMC scheme, which is a band assignment scheme of OFDMA used by the present invention. The Band AMC (Band Adaptive Modulation and Coding) scheme is a scheme in which subcarriers arranged on a frequency axis of physical subcarrier are arranged at the same positions on a frequency axis of logical subcarrier. For example, in the Band AMC scheme, the sequentially arranged physical subcarriers of C1, C2, C3, C4 and C5 are sequentially arranged in order of C1, C2, C3, C4 and C5 in the arrangement of logical subcarriers. In addition to the Band AMC scheme, there is an assignment scheme called PUSC (Partial Usage of Sub-Channels). FIG. 4 is an explanatory diagram of the PUSC scheme, which is a band assignment scheme of OFDMA. As shown in the figure, the arrangement of subcarriers on the frequency axis of physical subcarrier is changed quite randomly on the frequency axis of logical subcarrier. For example, in the PUSC scheme, the sequentially arranged physical subcarriers, C1, C2, C3, C4 and C5 are not sequentially arranged normally, but arranged in a random order such as C2, C1, C5, C3 and C4 in the arrangement of logical subcarriers. In the Band AMC scheme, since physical subcarriers and logical subcarriers are arranged on the same positions respectively, this scheme is used in a case where a beamforming is performed, and a great beamforming effect can be obtained when a terminal speed is not high. On the other hand, since physical subcarriers and logical subcarriers are arranged on quite different positions respectively in the PUSC scheme, it is known that this scheme is insusceptible to fading when moving.

Figure 5:
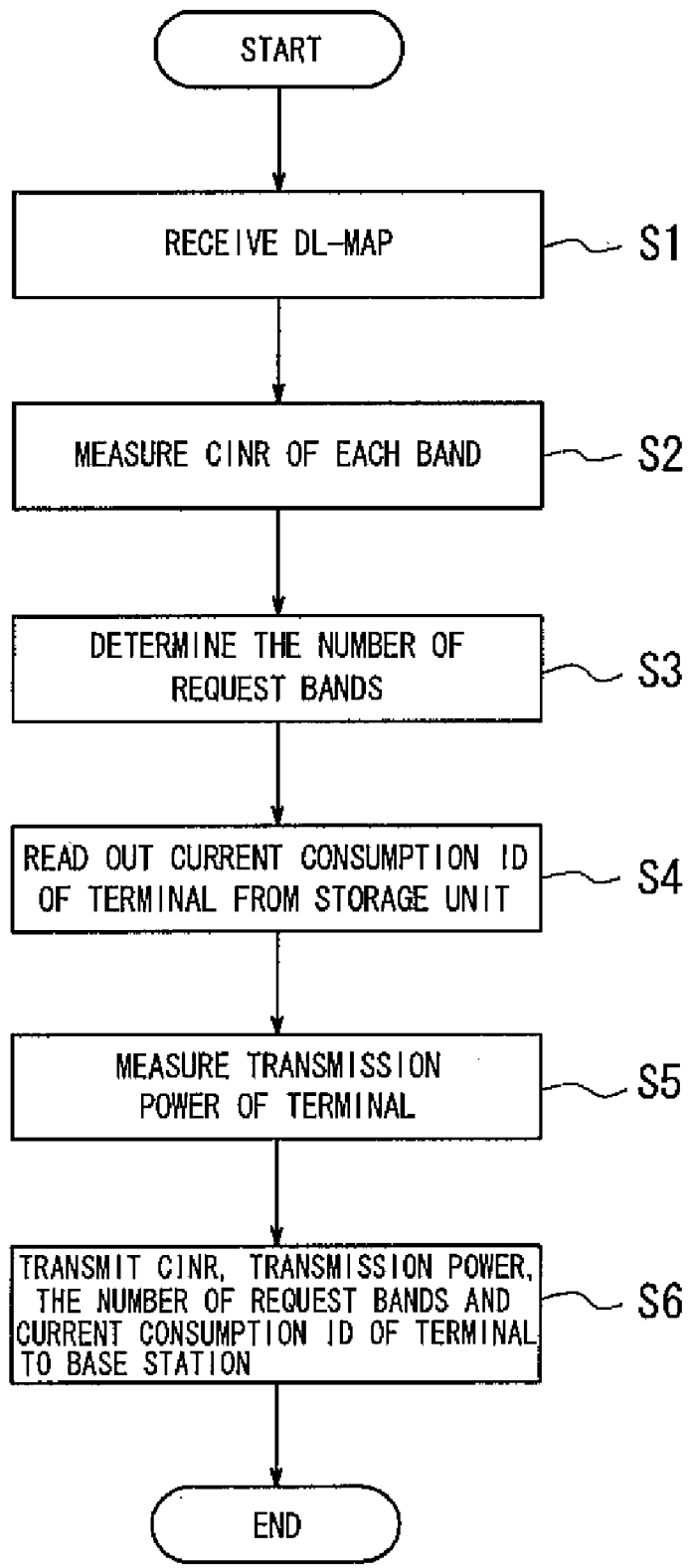
FIG. 5 is a flow chart of processing executed by a wireless communication terminal in accordance with an embodiment of the present invention.

FIG. 5 is a flow chart of processing executed by a wireless communication terminal in accordance with an embodiment of the present invention. As shown in the figure, the wireless communication terminal receives DL-MAP (Downlink-MAP) at step S1. The terminal that has received the DL-MAP notifies a base station, which is a transmission source, of CINR and transmission power of its own terminal. For the notification, the terminal measures CINR of each band (subcarrier) in the operating frequency (step S2). The terminal determines the number of bands to be requested based on CINR, which is the information indicating such reception state and can be an index of the propagation path information by use of the calculation means (processor such as CPU and MPU) (step S3).

The terminal can learn previously the type of itself, for example, a cellular phone type, a PCMCIA card type or the like. When the terminal is a cellular phone, the power supply to be used is a lithium ion battery and its current consumption is almost the same in any cellular phones. The current consumption ID of cellular phone to which its own terminal corresponds, which is 1, can be read out with reference to the current consumption table shown in FIG. 9 as an example. The table in FIG. 9 is held also on the base station side and is used to determine the number of bands based on the current consumption ID transmitted from the terminal. The terminal that has read out the current consumption ID of its own terminal from the table in FIG. 9 at step S4 measures the transmission power of the terminal at step S5. After that, at step S6, the terminal transmits the CINR, transmission power, the number of request bands and current consumption ID to the base station.

FIG. 10 shows the format of a message to be transmitted to the base station. FIG. 10(a) shows the conventional message format and FIG. 10(b) shows the message format which is partially modified to correspond to the present invention. As shown in FIG. 10(a), the format consists of a MAC header (bandwidth request header) containing the MAC information, a payload containing data and a CRC for checking errors. The conventional MAC header contains a bandwidth increase request (BWIR) in the field position ff1. However, in the present invention, instead of the bandwidth increase request (BWIR), a current threshold (CTH) is contained as shown in FIG. 10(b). That is, a current consumption ID is transmitted. The above is a terminal operation.

Figure 6:
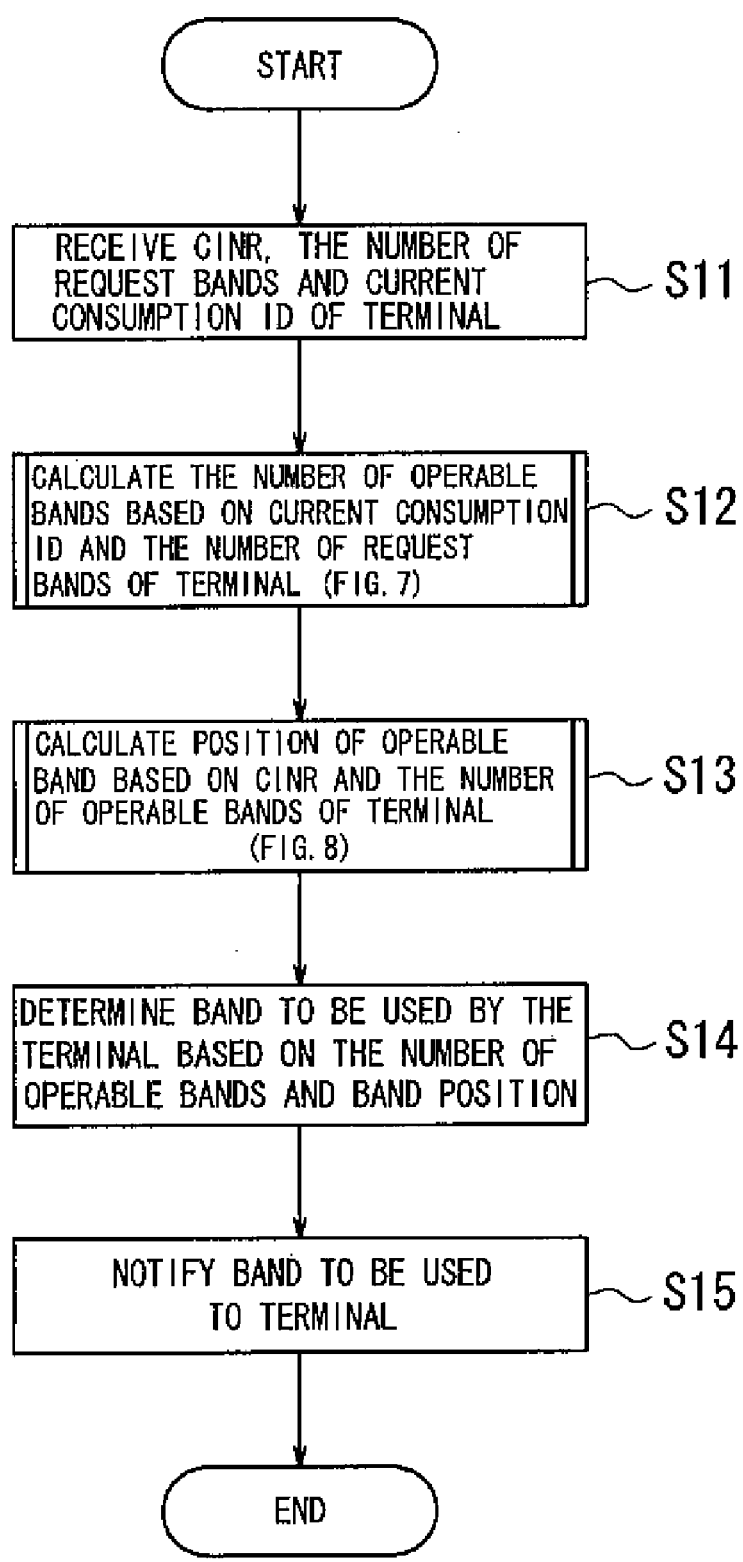
FIG. 6 is a flow chart of processing executed by a base station in accordance with an embodiment of the present invention.

FIG. 6 is a flow chart of processing executed by a base station in accordance with an embodiment of the present invention. As shown in the figure, at step S11, a base station receives the CINR, the number of request bands and the current consumption ID which are notified from the terminal. Then at step S12, the base station calculates the number of operable bands based on the received content. The details thereof are described later with reference to FIG. 7. After that, at step S13, the position of operable band is calculated based on the CINR of the terminal and the number of operable bands. The details thereof are described later with reference to FIG. 8. Further, at step S14, the band (the number of bands, band position) to be used by the terminal is determined based on the number of operable bands and the band position. Finally, at step S15, the content of the band (the number of bands, band position) to be used by the terminal is informed to the terminal and the process is completed.

<Band Number Determining Processing>

Figure 7:
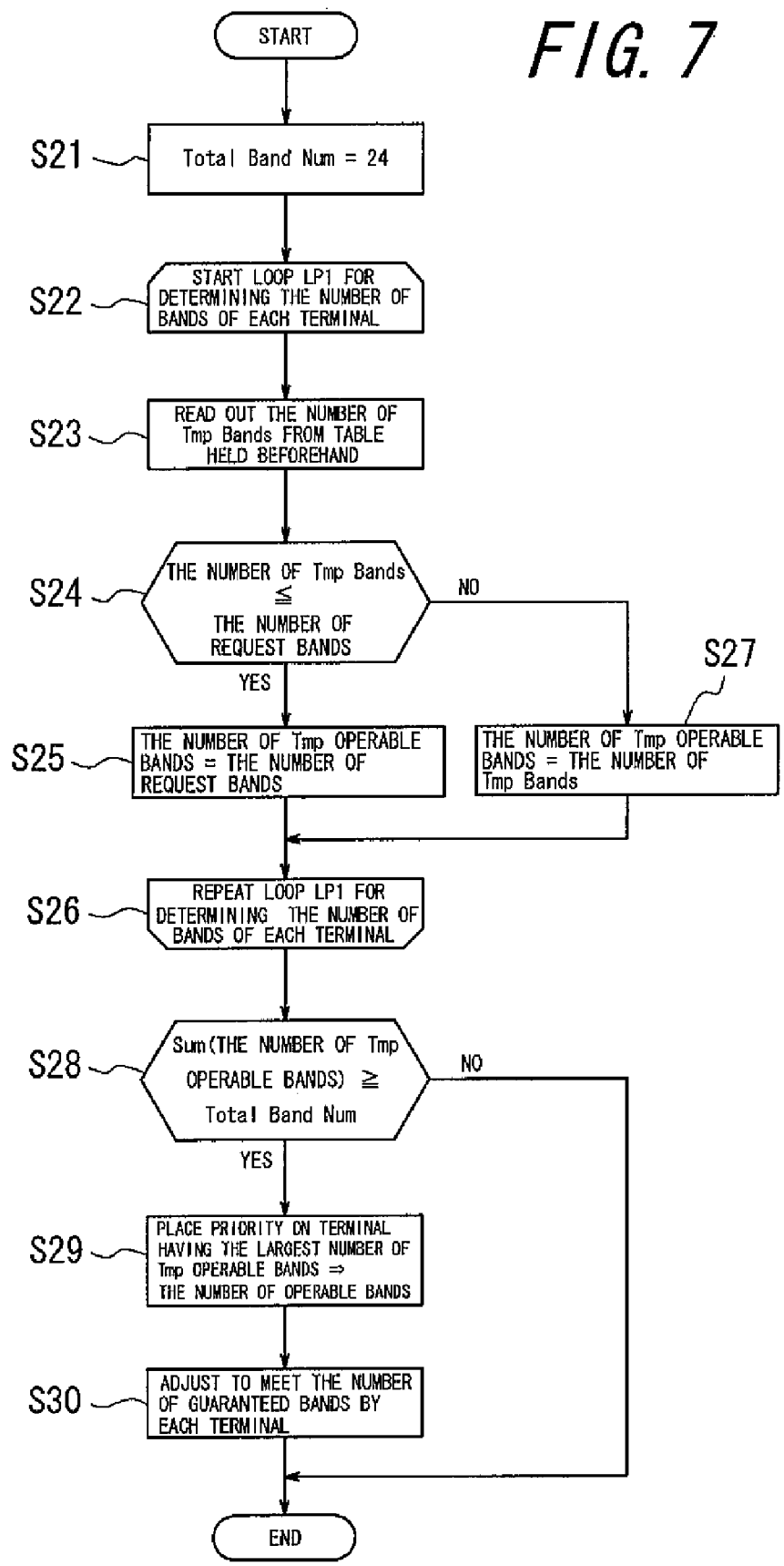
FIG. 7 is a flow chart of processing for determining the number of operable bands.

FIG. 7 is a flow chart of processing for determining the number of operable bands. As shown in the figure, since the number of maximum bands (subcarriers) of the Band AMC scheme is 24, the number is set at step S21. At step S22, a loop LP1 for determining the number of bands is initiated. At step S23, the number of Tmp_Bands that corresponds to the current consumption ID is read out from the table (FIG. 9) which is held beforehand by the base station. After that, at step S24, it is determined that whether or not the number of Tmp_Bands is equal to or less than the number of request bands transmitted from the terminal, then when it is equal to or less than the number, the process moves to step S25 and the number of request bands is set to the number of Tmp operable bands. When the number of Tmp_Bands is not equal to or not less than the number of request bands transmitted from the terminal, that is, when the number of Tmp_Bands is greater than the number of request bands, the process moves to step S27 and the number of Tmp_Bands is set to the number of Tmp operable bands. Thus it is possible to restrict the number of request bands so as not to exceed the maximum number of bands realized by the terminal. At step S26, the loop LP1 is repeated until the completion condition of loop, which is, processing is performed to all of the terminals, is met. Then when the condition is met (that is, processing of all of the terminals is completed), the process exits the loop and moves to the following step.

It is required to limit the total number of operating bands of each terminal not to exceed "24", the maximum number of bands according to Band AMC scheme. Therefore, at step S28, it is determined that whether or not the total value of the number of Tmp operable bands of each terminal "Sum (the number of Tmp operable bands)" is equal to or greater than the Total Band Num. If "Sum (the number of Tmp operable bands)" is equal to or greater than the Total Band Num, the number of operable bands is determined in decreasing order of the number of Tmp operable bands, placing priority on the terminal having the largest number of Tmp operable bands. Then at step S30, adjustment is made to meet the number of guaranteed bands shown in the table in FIG. 9 so that all of the terminals can transmit to the base station. For example, it is possible to take some bands from the terminal having the largest number of operable bands. Further, it is conceivable that priority is placed on the terminal having the largest number of operable bands and bands are taken from the terminals having the second and third largest number of operable bands for assignment. If the total number of Tmp operable bands of each terminal is smaller than the Total Band Num, since it does not exceed the maximum number of bands according to the Band AMC scheme, the operable band number determining processing is completed.

<Band Position Determining Processing>

Figure 8:
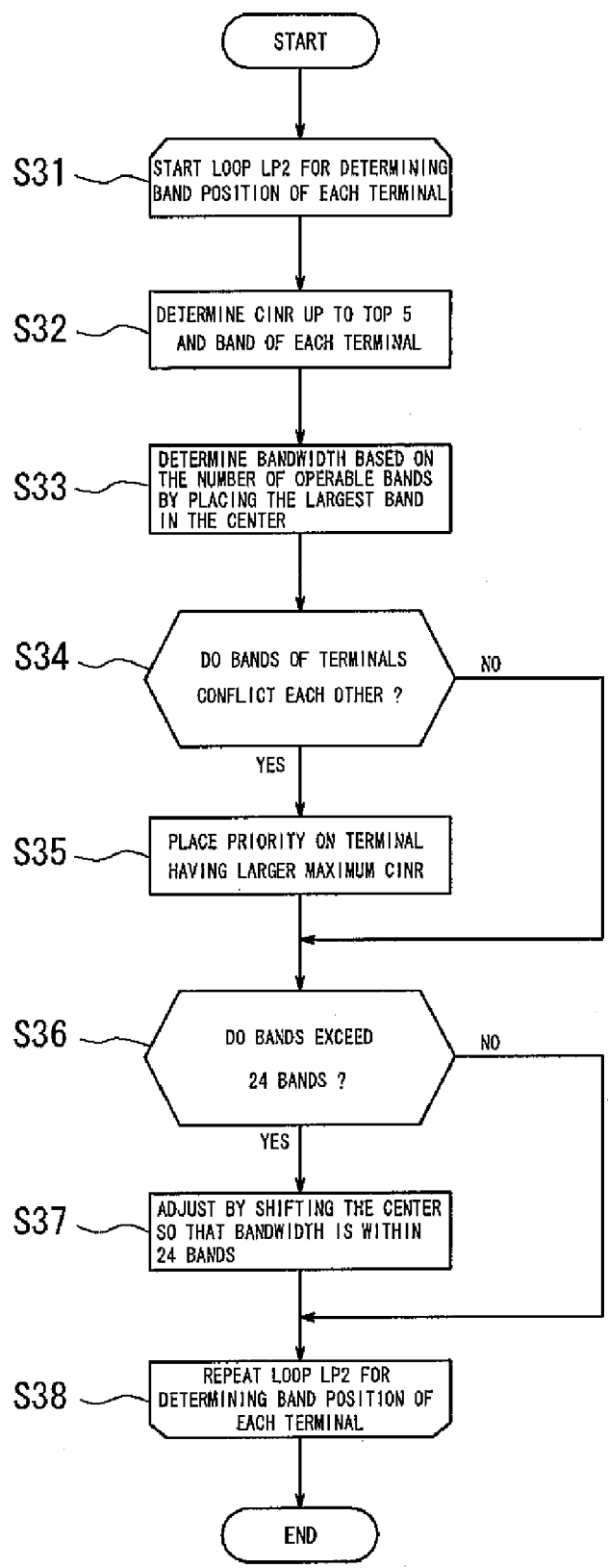
FIG. 8 is a flow chart of processing for determining the position of operable band in accordance with an embodiment of the present invention.

FIG. 8 is a flow chart of processing for determining the operable band position in accordance with an embodiment of the present invention. As shown in the figure, at step S31, a loop LP2 for determining the band position of each terminal is initiated. At step S32, the CINR and a band of each terminal are determined in a predetermined order, in this case, up to top $5^{th}$. After that, at step S33, the largest band with the largest CINR is placed in the center and the bandwidth is determined based on the number of operable bands. Here, when the number of operable bands is even number, the band whose frequency is larger is temporarily placed in the center. The determined bands of terminals may conflict each other. Therefore, at step S34, it is determined that whether or not the determined bands overlap (conflict) each other between the terminals. When it is determined that the determined bands overlap each other between the terminals, at step S35, a band assignment processing is performed by placing priority on a terminal whose maximum CINR is larger in order to place priority on a terminal in a better state of propagation path. Further, in order to observe the restriction that the total band number of terminals should not exceed 24 bands, which is the maximum number, at step S36, it is determined that whether or not the determined bands exceeds 24 bands. If it exceeds, the process moves to step S37 and adjustment is made by shifting the center of the determined band group so as not to exceed 24 bands. At step S38, the loop LP2 is repeated until the completion condition of loop, which is, processing is performed to all of the terminals, is met. Then when the condition is met (that is, processing of all of the terminals is completed), the process exits the loop and is completed.

Figure 12:
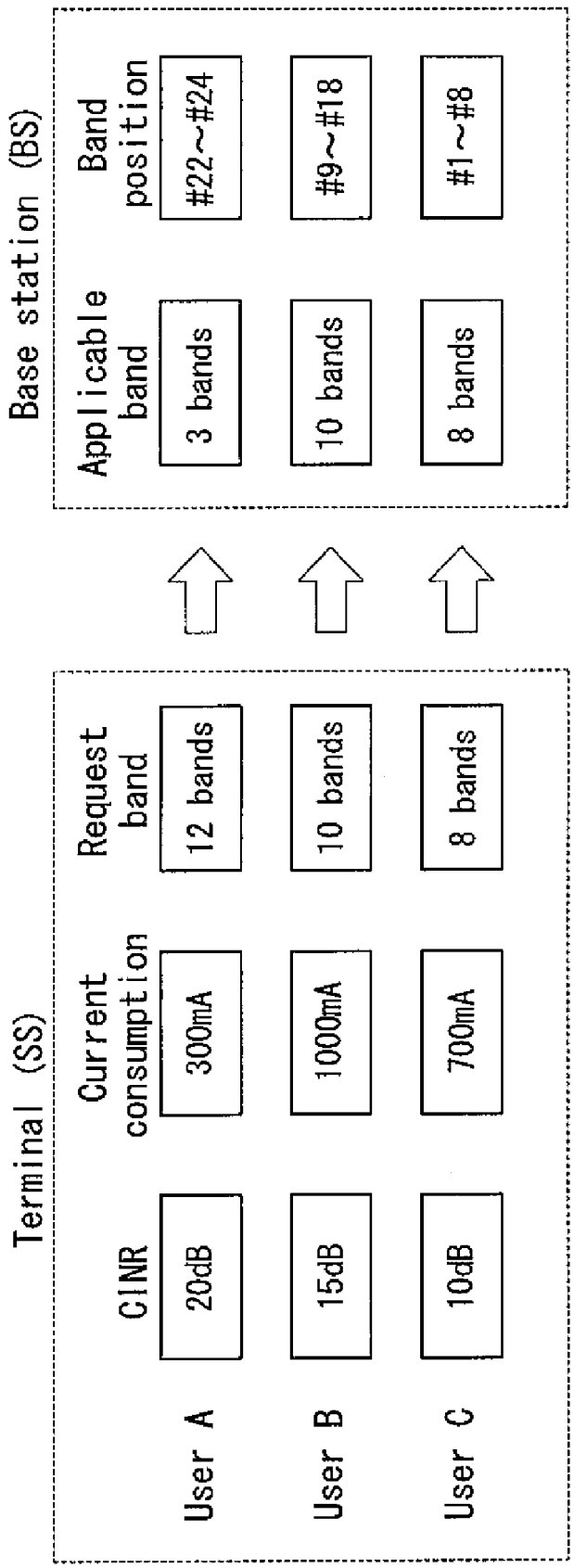
FIG. 12 shows data transmitted by a terminal (SS) to a base station (BS) and applicable bandwidths and band positions set by the base station (BS) in accordance with the processing of the present invention.
Figure 13:
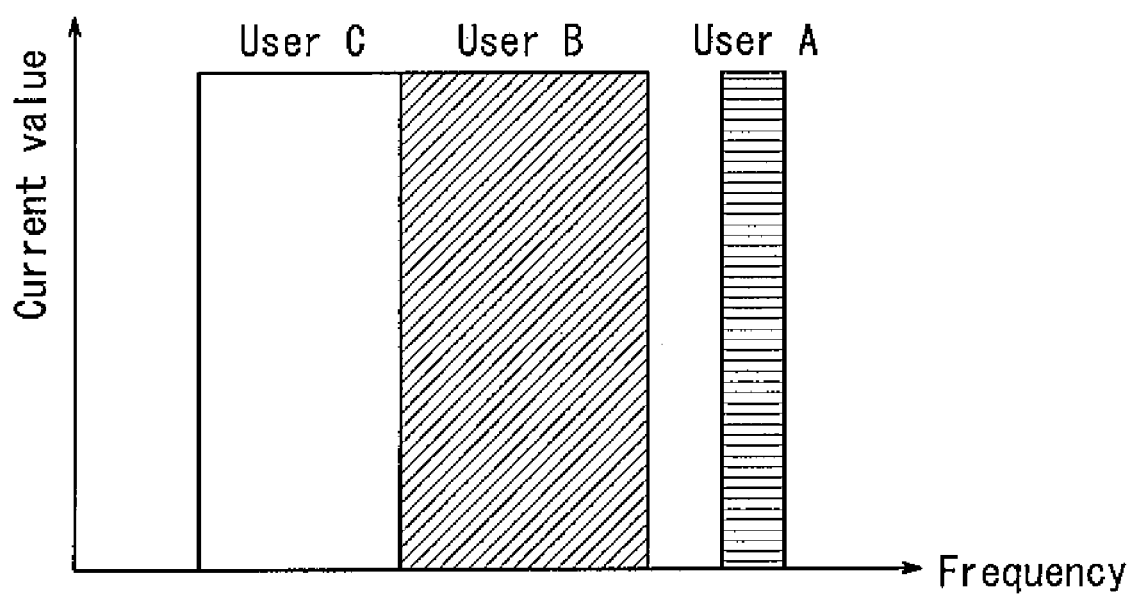
FIG. 13 shows determined applicable bands and band positions.

FIGS. 12 and 13 show a concrete example in the case where frequency assignment is performed in accordance with a wireless communication method of the present invention. FIG. 12 shows data transmitted from the terminal (SS) to the base station (BS) and applicable bands and band positions set by the base station (BS) in accordance with the processing of the present invention. FIG. 13 shows determined applicable bands and band positions. In FIG. 12, there are three users, for example, and current consumptions, propagation path states (CINR) and request bandwidths of the terminals used by the users are notified to the base station, and the base station determines the number of bands and position for each terminal based on the information. Here, CINR is mentioned above. However, in this case, it is assumed that there are practically CINRs for 24 bands and the largest CINR is extracted. User A requests 12 bands and a large bandwidth, because its CINR is very good. However, its current consumption is 300 mA, which is low, because of USB terminal. Thus it is not possible to transmit transmission power for a number of bands. Therefore, the applicable band is 3 bands in accordance with the assignment technique of the present invention. In the same marnier, in the case of user B, CINR is 15 dB, which is not bad, and the terminal is modem type to which power is supplied stably from an AC power supply, and thus a sufficient band can be secured. In addition, the request band of user B is 10 bands, which is smaller than the bandwidth of the modem type terminal shown in the table in FIG. 9. Therefore the request band can be used without being changed. In the case of user C, CINR is not so high and the request band is set a little bit narrow. In addition, since it is a cellular phone terminal type, its current consumption of 700 mA is sufficient to perform transmission of 8 bands. Therefore the request band is used in the applicable band without being changed. Bands are arranged as shown in FIG. 13. Priority is placed on the terminal having a better CINR and the most appropriate position is set so that the bands are within the bandwidth. Here, there is a band that transmits nothing between user B and user A. With respect to this, in order to increase the whole throughput, when the total applicable bands are under 24 bands, as a remedy, it is possible to increase the number of bands for user B so as not to exceed the number of operable bands at the end of the flow chart in the figure. In this case, it is possible to increase by 2 bands. The example shows a very simple case, however, even when the user uses the same terminal and requests the same band, it is possible to prioritize because determination is possible based on CINR. Further, even if there are many terminals having a large request band, the number of operable bands is set not to exceed Total Band Num, which is "24". Therefore, if an SDMA (Spatial Division Multiple Access) is implemented, the number of usable bands is 48 when the spatial multiplex number is 2 and the number of usable bands is 72 when the spatial multiplex number is 3. Therefore, the number of bands becomes large by the SDMA, and thus versatility is improved.

Embodiments of the present invention are described above. In the present invention, when one user can use 24 bands, the system throughput can be further improved based on the GPS (Global Positioning System) information or the like by assigning bands according to a moving state of a terminal with the Band AMC scheme when the user's terminal does not move or is moving at a low speed of less than 10 km/h, and with the PUSC scheme that is insusceptible to speed dependency when the terminal is moving at a middle to high speed over 10 km/h.

Effects and advantages of the present invention are described again. According to the present invention, the base station obtains information on power which the terminal can transmit, and thus the base station crosschecks the region in a good state of propagation path by the estimation of propagation path, the band of power which the terminal can transmit at maximum transmission power and the transmission power request due to power control between the base station and the terminal and transmits a request to achieve the best performance to the terminal. Thus it is possible to reduce the current consumption and power consumption of the terminal and maximize a system throughput. In addition, when the whole band can be used, it is possible to prevent deterioration of performance due to speed dependency for movement at middle to high speeds caused by the frequency diversity effect by achieving the PUSC (Partially Used Subchannelization) scheme in which necessary subcarriers are partially extracted at random from the predetermined band.

FIG. 11 shows a band assignment in accordance with the technique of the present invention. FIG. 11(a) shows band assignment according to the normal Band AMC scheme for comparison. In the normal Band AMC scheme, the bands B1, B3, B5, B6 and B8 used by terminals respectively are arranged separately in the operating band. Therefore, transmission should be done by using all of the frequency bands from B1 to B8. That is, since the apparent band is large, the consumption power increases accordingly. The current consumption of the terminal increases when the band expands with the same transmission power, and there is a possibility that the operable time of a terminal and the operable time of a PC or the like to which a terminal is attached decreases.

Further, in some cases, a terminal or a PC to which a terminal is attached may be reset. In that case, although it is possible to handle the situation by decreasing the transmission power, it is desirable to perform communication without reducing the power because of a possibility of deterioration of communication quality due to decreased transmission power.

Consequently, as shown in FIG. 11(b), when the terminal uses 5 bands, transmission is performed not through the bands arranged separately, but through the bands arranged sequentially without clearance like B3 to B7 by use of the technique of the present invention. Therefore the apparent band can be narrowed (made small), thus the current consumption of the terminal can be kept low.

While the present invention has been described with reference to drawings and embodiments, it should be noted that those skilled in the art can make various variations and modifications easily based on the present disclosure and therefore these variations and modifications are included within the scope of the present invention. For example, functions or the like included in each unit, each means, each step or the like can be rearranged so as not to cause logical discrepancies and a plurality of means, steps and the like can be combined or divided.

CROSS REFERENCE TO RELATED APPLICATION

This application claims priority to and the benefit of Japanese Patent Application No. 2007-088873 (filed on Mar. 29, 2007), the whole contents of which are incorporated herein by reference.

The invention claimed is:

1. A wireless communication method for performing wireless communication between a base station and a wireless communication terminal, comprising:
   a reception state measuring step at which the wireless communication terminal measures information indicating a reception state of the wireless communication terminal;
   a first frequency band number determining step at which the wireless communication terminal determines a number of first frequency bands to be requested to the base station based on the information indicating the reception state;
   a transmitting step at which the wireless communication terminal transmits information indicating the number of first frequency bands to be requested to the base station to the base station;
   a receiving step at which the base station receives the information indicating the number of first frequency bands which is transmitted from the wireless communication terminal;
   an acquiring step for acquiring information indicating an upper limit of a value based on current consumption of the wireless communication terminal;
   a second frequency band number determining step for determining a number of second frequency bands to be assigned to the wireless communication terminal based on the acquired information indicating the upper limit of the value based on the current consumption; and
   a frequency band number setting step for setting the number of first frequency bands to a number of frequency bands to be assigned to the wireless communication terminal when the number of first frequency bands is equal to or less than the number of second frequency bands and setting the number of second frequency bands to the number of frequency bands to be assigned to the wireless communication terminal when the number of first frequency bands is greater than the number of second frequency bands.

2. The wireless communication method according to claim 1, wherein
   at the transmitting step, the information indicating the reception state of the wireless communication terminal is transmitted with the number of first frequency bands to the base station;
   at the receiving step, the information indicating the reception state of the wireless communication terminal is received with the number of first frequency bands which is transmitted from the base station; and
   the wireless communication method further comprises a position setting step at which the base station sets a position of each frequency band to be assigned based on the information indicating the reception state of the wireless communication terminal and the number of frequency bands to be assigned.

3. The wireless communication method according to claim 1, further comprising:
   a second frequency band number setting step at which, when the base station receives a plurality of pieces of information indicating the number of first frequency bands which are transmitted from a plurality of wireless communication terminals, the base station sets the number of frequency bands by placing priority on a wireless communication terminal whose upper limit of a value based on current consumption is larger among the plurality of wireless communication terminals in a case where a sum of the numbers of second frequency bands to be used by the plurality of wireless communication terminals is greater than a predetermined number of frequency bands.

4. The wireless communication method according to claim 1, further comprising:
   a moving speed information acquiring step at which the base station acquires information on moving speed of the wireless communication terminal; and
   a frequency assigning scheme determining step at which the base station determines a frequency assigning scheme to be used when assigning frequency to the wireless communication terminal based on the information on the moving speed of the wireless communication terminal.

5. A wireless communication system for performing wireless communication between a base station and a wireless communication terminal, wherein
   the wireless communication terminal comprises:
   a reception state measuring unit for measuring information indicating a reception state of the wireless communication terminal;
   a band number determining unit for determining a number of first frequency bands to be requested to the base station based on the measured information indicating the reception state; and
   a transmitting unit for transmitting information indicating the number of first frequency bands to be requested to the base station to the base station, and
   the base station comprises:
   a receiving unit for receiving the information indicating the number of first frequency bands which is transmitted from the wireless communication terminal;
   an information acquiring unit for acquiring information indicating an upper limit of a value based on current consumption of the wireless communication terminal;

a band number determining unit for determining a number of second frequency bands to be assigned to the wireless communication terminal based on the acquired information indicating the upper limit of the value based on the current consumption; and a band number setting unit for setting the number of first frequency bands to a number of frequency bands to be assigned to the wireless communication terminal when the number of first frequency bands is equal to or less than the number of second frequency bands and setting the number of second frequency bands to the number of frequency bands to be assigned to the wireless communication terminal when the number of first frequency bands is greater than the number of second frequency band.

6. A base station for performing wireless communication with a wireless communication terminal, comprising:

a terminal information acquiring unit for acquiring information indicating an upper limit of a value based on current consumption of the wireless communication terminal and a number of first frequency bands requested by the wireless communication terminal;

a band number determining unit for determining a number of second frequency bands to be assigned to the wireless communication terminal based on the acquired information indicating the upper limit of the value based on the current consumption; and a band number setting unit for setting the number of first frequency bands to the number of frequency bands to be assigned to the wireless communication terminal when the number of first frequency bands is equal to or less than the number of second frequency bands and setting the number of second frequency bands to the number of frequency bands to be assigned to the wireless communication terminal when the number of first frequency bands is greater than the number of second frequency bands.

* * * * *